US009906145B2

(12) United States Patent
Langeslag et al.

(10) Patent No.: US 9,906,145 B2
(45) Date of Patent: Feb. 27, 2018

(54) POWER CONVERTER WITH LOAD SWITCH FAULT PROTECTION

(71) Applicant: NXP B.V., Eindhoven (NL)

(72) Inventors: Wilhelmus Hinderikus Maria Langeslag, Wijchen (NL); Jeroen Kleinpenning, Lent (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/184,573

(22) Filed: Jun. 16, 2016

(65) Prior Publication Data

US 2017/0366092 A1 Dec. 21, 2017

(51) Int. Cl.
*H02M 3/335* (2006.01)
*H02H 7/10* (2006.01)
*H02M 7/757* (2006.01)
*H02M 1/08* (2006.01)
*H02M 1/32* (2007.01)

(52) U.S. Cl.
CPC ......... *H02M 3/33523* (2013.01); *H02M 1/08* (2013.01); *H02M 1/32* (2013.01)

(58) Field of Classification Search
CPC ....... H02M 2001/325; H02M 3/33507; H02M 3/33523
USPC .......... 323/276, 277; 361/54, 56, 57, 59, 60, 361/61; 363/21.04–21.1, 21.12–21.17, 363/50, 52–54, 76, 78, 79
See application file for complete search history.

(56) References Cited

U.S. PATENT DOCUMENTS

| | | | |
|---|---|---|---|
| 5,841,313 A | 11/1998 | Levin et al. | |
| 2011/0038184 A1* | 2/2011 | Sutardja | H02M 3/335 363/21.17 |
| 2014/0098578 A1* | 4/2014 | Halberstadt | H02M 3/33515 363/21.15 |
| 2014/0218976 A1* | 8/2014 | Luo | H02M 1/08 363/21.01 |
| 2014/0268914 A1* | 9/2014 | Wang | H02M 3/33592 363/21.13 |
| 2014/0268919 A1* | 9/2014 | Yao | H02M 3/33523 363/21.15 |
| 2015/0015300 A1 | 1/2015 | Simonson et al. | |

(Continued)

OTHER PUBLICATIONS

Power Integrations; "Power Integrations Design Example Report Title 20 W USB PD Power Supply Using Cypress CCG2 CYPD2134 and Inno Switch Mobile Phone Charger"; retrieved from the Internet: URL; http://www.cypress.com/file/231126/ download retrieved Nov. 1, 2017; (Feb. 23, 2016).

(Continued)

*Primary Examiner* — Gary Nash

(57) ABSTRACT

An apparatus for delivering power to a load, which comprises a power converter that converts input power at a primary side to an output power and to a supply voltage to a secondary side. On the secondary side, a load switch is located on a current path to the load. A secondary-side control circuitry controls the load switch to operate in an ON mode in which current is provided to the load, and in response to a fault condition corresponding a voltage drop across the load switch exceeding a threshold value, activates circuitry on the secondary side. The circuitry, in response to the fault condition, causes the primary-side control circuitry to limit an extent to which the power converter is capable of supplying power.

18 Claims, 6 Drawing Sheets

(56) References Cited

U.S. PATENT DOCUMENTS

| | | | |
|---|---|---|---|
| 2015/0043248 A1 | 2/2015 | Hsiao et al. | |
| 2015/0049523 A1* | 2/2015 | Yang | H02M 3/33592 363/21.14 |
| 2015/0103567 A1* | 4/2015 | Wang | H02M 3/33592 363/21.13 |
| 2016/0087422 A1 | 3/2016 | Mourrier et al. | |

OTHER PUBLICATIONS

Power Integrations; INN2214-2215 InnoSwitch-CP Family Off-Line CV/CC Flyback Switcher IC with Integrated 650 V MOSFET, Sync-Rect, Feedback and Constant Power Profile for USB-PD and QC 3.0 This Product is Covered by Patents and/or Pending Patent Appliations. Product Highlights Highly Integrated, Compact Footprint; retrieved http://www.mouser.com/ds/2/328/innoswitch-cp_datasheet-837922.pdf (Nov. 1, 2017).

Ez Cypress: "PRELIMINARY EZ-PD™ CCG2 Datasheet USB Type-C port Controller General Description Flash (32KB) SRAM (4KB) Serial Wire Debug Programmable I/O Matrix CCG2: USB Type-C Cable Controller CORTEX-MO 48 MHz Integrated Digital Blacks I/O Subsystem MCU Subsystem Advanced High-Performance Bus (AHB)"; retrieved http://www.mouser.com/ds/2/100/EZ-PD_CCG2_Datasheet_001-93912_OF_V-541553.pdf (Apr. 30, 2015).

* cited by examiner

POWER CONVERTER WITH LOAD SWITCH FAULT PROTECTION

Aspects of the instant disclosure are directed to power conversion circuits (e.g., isolated power converters such as flyback converters and/or power converters without mains isolation, such as a buck or boost converter) in which AC/DC power is converted to DC power.

In various instances, the demand for an amount of power being delivered to circuitry by a converter is increasing. For example, a mobile phone has consumer demands for faster charging. A high voltage can be used to deliver fast charging for a battery. The voltage delivered to the circuitry must also be compatible for the converter, such as the charger of the mobile phone. Many chargers operate starting at 5 volts (V) and negotiate the voltage to a higher voltage, e.g., 9, 12, or 20V. Different standards are used to negotiate the voltages, such as USB-PD, Quick Charge, AFC, and FCP, among other standards. When a fault condition occurs, the connected circuitry needs to be protected.

These and other matters have presented challenges to efficiencies of converters and voltage protection implementations, for a variety of applications.

SUMMARY

Various example embodiments are directed to issues such as those addressed above and/or others which may become apparent from the following disclosure concerning power converters and protection from over-power in a load switch.

In certain example embodiments, aspects of the present disclosure involve a load switch on the secondary side of the power converter used to protect the load circuitry from a fault condition of the converter and, in response to a fault condition of the load switch on the secondary side, the secondary side provides feedback to the primary side to limit the extent to which the power converter supplies power for providing a supply voltage at the secondary side and to protect against burning of the load switch.

In a more specific example embodiment, an apparatus delivers power to a load having circuitry that draws power from the apparatus. The apparatus comprises a power converter that converts input power on a primary side of the power converter to output power and a supply voltage at a node on a secondary side of the power converter. The primary side includes primary-side control circuitry that limits an extent to which the power converter is capable of supplying power for providing the supply voltage. The secondary side includes a load switch, a secondary-side control circuitry, and circuitry. The load switch is arranged along a current path between the node and the load. The secondary-side control circuitry receives the supply voltage (e.g., Vcc) and controls the load switch. For example, the secondary-side control circuitry controls the load switch to operate in an ON mode in which the current path is used to provide current to the load. A fault condition of the load switch (e.g., a drain-gate short) can occur that corresponds to a voltage drop across the load switch exceeding a threshold voltage. In response to the fault condition of the load switch, the secondary side control circuitry activates the circuitry on the secondary side. The circuitry causes the primary-side control circuitry to limit an extent to which the power converter is capable of supplying power in response to the fault condition. For example, the circuitry triggers a control signal which is provided to the primary-side control circuitry as feedback. The primary-side control circuitry responds to the control signal by limiting the supply power, such as operating in a lower power mode than the previous power mode.

In another specific example embodiment, the control circuitry on the primary and/or secondary sides of the power converters include USB power-delivery controller circuits. For example, an apparatus includes a power converter that converts input power at a primary side of the power converter and provides a supply voltage at a node on a secondary side of the power converter. On the primary side of the power converter, a primary-side control circuitry is used to limit an extent to which the power converter is capable of supplying power for providing the supply voltage (e.g., in response to feedback from the secondary side or a primary over-voltage protection). A load switch on the secondary side is located along a current path between the node and the load having load circuitry. Further, on the secondary side of the power converter, a USB power-delivery controller circuit receives the supply voltage and controls the load switch. The USB power-delivery controller circuit controls the load switch to operate in an ON mode in which the current path is used to provide current to the load. In various aspects, the USB power-delivery controller circuit controls the load switch (in the ON mode and OFF mode) and controls the power (e.g., voltage and/or current) output to the load. In response to a fault condition of the load switch (e.g., a drain-gate short of the load switch) corresponding to a voltage drop across the load switch that exceeds a threshold voltage, the USB power delivery controller circuit activates circuitry on the secondary side and the circuitry causes the primary-side control circuitry to limit an extent to which the power converter is capable of supplying power.

In other specific example embodiments, the power converter is a multiple output voltage converter (e.g., adapter) that can provide multiple output voltages to the load. For example, the power converter provides the supply voltage as one of multiple voltages that is selected based on feedback from the load to the USB power-delivery controller circuit on the secondary side. The circuitry triggers a control signal (e.g., changed control signal) in response to an indication of the fault condition and causes the USB power-delivery controller circuit to limit the extent to which the power converter supplies power regardless of which one of multiple voltages is selected. For example, in response to the control signal (e.g., a power control signal), the primary-side control circuitry on the primary side operates in a power mode which results in an output voltage to the load that is lower than each of the multiple output voltages. The USB power-delivery controller circuit on the secondary side can communicate with the load about voltage and current levels. For example, during normal operations, when the load is changing power modes, the load communicates with the USB power-delivery controller circuit to change the setpoint of the voltage at the secondary side. The changed setpoint of the voltage leads to a changed power control signal that is communicated to the primary side by the secondary side, such as by an opto coupler, which results in the output voltage changing to a new value.

In a number of embodiments, the circuitry is used to provide feedback to the primary side to control the supply voltage on the secondary side, such as during basic power control (as described further herein) or in response to fault conditions. For example, the circuitry changes the control signal (e.g., a communication of a voltage measurement of the Vcc voltage) which is provided to the primary-side control circuitry as feedback. The primary-side control circuitry responds to the changed control signal by limiting (e.g., decreasing) the supply power. As a specific example, the load asks for power and then because of a fault condition, the load switch is switched to operate in an OFF mode (e.g., the load switch is opened by the secondary-side control circuitry). Initially the supply voltage (Vcc voltage) rises which is detected by the secondary-side control circuitry by the voltage measurement of the Vcc voltage (e.g., by a resistance divider circuitry). This is communicated to the primary side by the circuitry and as a result, the delivered power is reduced.

In other specific embodiments, a method includes controlling the input power on a primary side of a power converter and providing a supply voltage at a node on a secondary side of the power converter. The supply voltage is one of multiple voltages that is selected based on feedback from a load to control circuitry (e.g., a secondary-side control circuitry). The method further includes receiving the supply voltage at the node and passing the supply voltage along a current path from the node to the load. In response the supply voltage, a load switch is controlled to operate in an ON mode in which the first current path is used to provide current to the load. And, in response to a fault condition of the load switch (e.g., drain-gate short) corresponding to a voltage drop across the load switch exceeding a threshold voltage for greater than a threshold period of time, the method includes providing a control signal to the control circuitry (e.g., primary-side control circuitry) to limit an extent to which the power converter is capable of supplying power for providing the supply voltage.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
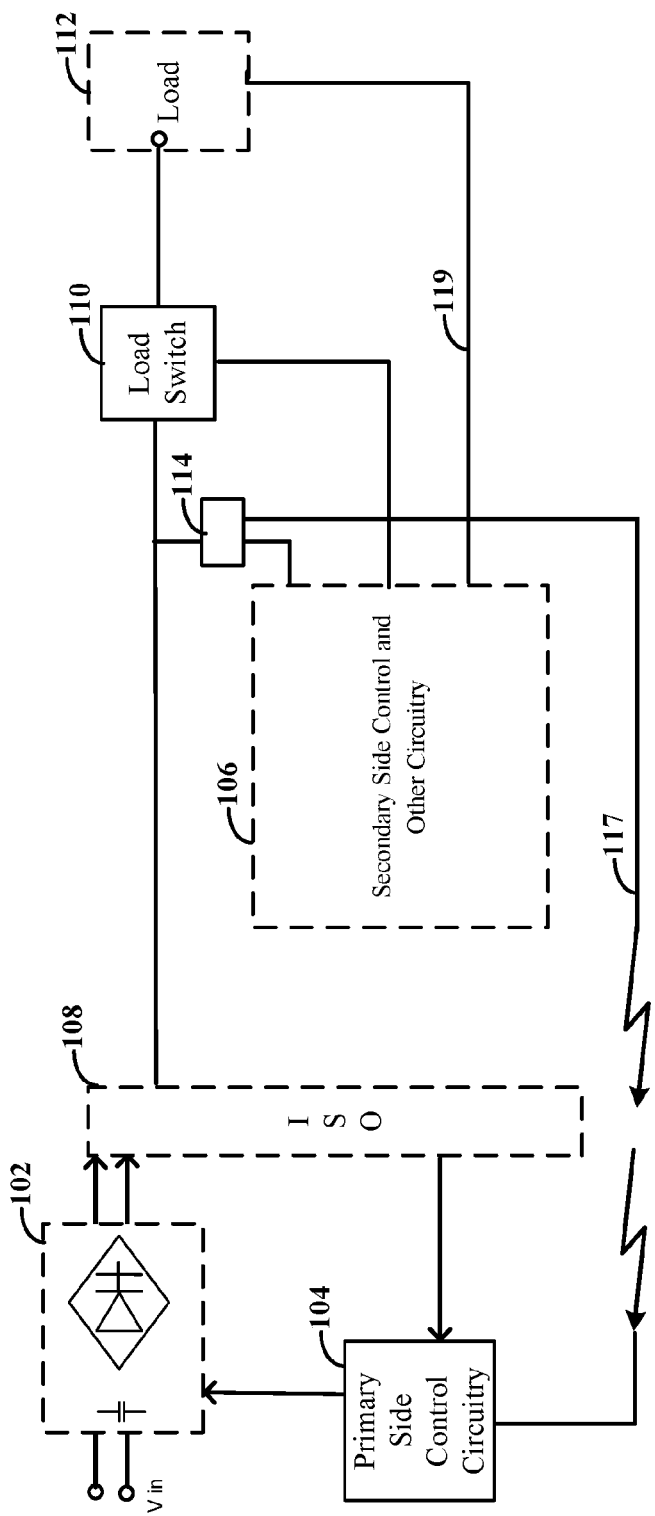
FIG. 1A is an apparatus-level diagram illustrating an example power converter, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving circuitry on a secondary side of a power converter that causes the primary side to limit the supply of input power in response to a fault condition of a load switch on the secondary side of the power converter. In certain implementations, aspects of the present disclosure have been shown to be beneficial when used in the context of a charger configured to deliver power to a load (e.g., cell phone) having circuitry which limits a supply power delivered to the secondary side in response to a voltage drop across a load switch on the secondary side of the load exceeding a threshold voltage for greater than a threshold period of time. In some embodiments, the voltage drop across the load switch indicates a drain-gate short of the load switch. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various voltage converters have multiple voltages that can be output by the converter. A converter refers to or includes circuitry configured to deliver power to a load. Example converters include a charger, an adapter, etc. The converter can be a power converter that has two circuitry sides (e.g., two isolated sides). The power converter converts input power at the primary side and provides a supply voltage (Vcc) at a node on the secondary side. Generally, the primary side provides primary over-voltage protection. For a single output voltage, the circuitry on the primary side providing the primary over-voltage protection can be enough to protect circuity of the load from an over-voltage condition.

With a multiple output voltage converter, the internal circuits are supplied via a supply pin and the over-voltage protection on the primary side may not always protect the load circuitry. For example, with a multiple output voltage converter, the over-voltage protection at the primary side of the device can trigger above the highest output voltage of the multiple output voltages. In various embodiments, a load switch is arranged along a current path between the node provided with the supply voltage and the load on the secondary side of the converter. The load switch connects or disconnects the load to the current path, which determines the power output to the load (e.g., voltage or current to the load). For example, during an ON mode of the load switch, current is provided to the load. During an OFF mode, the current to the load is blocked. The secondary-side control circuitry monitors the supply voltage on the node and in response the supply voltage exceeding the setpoint voltage (e.g., a range of voltages), turns off the load switch (e.g., opens the load switch) which changes the control signal. For example, in response to the load switch operating in the OFF mode, the supply voltage on the node increases which is measured by the secondary-side control circuitry and triggers a control signal provided by an opto coupler to the primary side. In response to the control signal, the primary-side control circuitry limits an extent to which the power converter supplies power. In specific embodiments, the control signal includes a WL power control which is changed via an opto coupler. The changed power control signal can be an analog signal that determines the delivered power at the primary side. However, in various embodiments, a fault condition of the load switch occurs in which the secondary side is unable to turn off the load switch and the load switch may burn up and/or cause an increase in heat. The fault condition of the load switch includes a drain-gate short of the load switch.

In response to the fault condition of the load switch, the power converter continues to operate resulting in load switch dissipation that is greater than normal operation. Various embodiments in accordance with the present disclosure include monitoring a voltage drop across the load switch and providing feedback to the primary side in response to a voltage drop that is indicative of a fault condition of the load switch. In response to the feedback, the primary-side control circuitry limits the converter power used for providing the supply voltage to the secondary side. The limited supply includes a lower power mode in which the output voltage and current are reduced from the previous (normal) operation mode. The lower output voltage prevents or mitigates damage to connected load circuitry and the lower output current reduces the dissipation in the load switch.

A number of embodiments are directed to an apparatus for delivering power to a load. The load has circuitry (herein generally referred to as load circuitry) that is powered by the power that is output by the apparatus. The apparatus is a power converter with two sides: a primary side and a secondary side. For example, the apparatus includes a transformer with circuitry on the primary side and the secondary side that transfers power from the primary side to the secondary side through the transformer. Further, the primary side includes a primary-side control circuitry that can limit an extent to which the power converter can supply power for providing a supply voltage. In specific embodiments, the load is a mobile phone and the apparatus is a charger.

The load and its corresponding circuitry can be protected from an over-voltage condition by the power converter. For example, the primary side includes the primary-side control circuitry to limit a supply power for providing the supply voltage. While the primary-side control circuitry may include over-voltage protection circuitry to provide primary over-voltage protection, the protection may not fully protect the load circuitry. For example, the threshold voltage that triggers the primary over-voltage protection may be higher than the load circuitry can handle. The secondary side includes a load switch and secondary-side control circuitry to protect the load circuitry from over-voltage based on a setpoint voltage value (which can be lower than the threshold voltage that triggers the primary over-voltage protection and as provided as feedback from the load to the secondary side). The load switch is located on the secondary side along a current path between the node and the load. The load switch is turned on and off to operate in an ON mode and an OFF mode. During the ON mode, current is provided to the load via the current path from the node to the load. In the OFF mode, current is blocked from the load along the current path. The secondary-side control circuitry located on the secondary side is used to control the load switch to operate in the ON mode and OFF Mode. The secondary-side control circuitry switches the load switch into the ON and OFF modes to control the power output to the load (e.g., the voltage or current to the load). For example, the secondary-side control circuitry monitors the supply voltage on a node on the secondary side. In response the supply voltage on the node exceeding the setpoint voltage (e.g., a range of voltages), the load switch is turned off (e.g., opens the load switch) which triggers a (changed) control signal.

While the load switch is utilized to protect the load circuitry from over-voltage by the secondary-side control circuitry, a fault condition of the load switch can also occur. A fault condition of the load switch includes a drain-gate short of the load switch. With a drain-gate short, the load switch operates as a source follower and dissipation of the load switch increases more than in normal operation of the load switch. As a specific example, for a charger operating with 3 amps (A) load current, the power dissipation in a 10 mOhm load switch is 90 mW in normal operation, and the dissipation increases to about 6 W in response to a drain-gate short (e.g., logical level load switch with 2V gate source voltage for conduction of 3 A). In the above provided example, the load switch is designed for heat removal on 90 mW and the 6 W is too large as the charger is designed for maximum power density without a margin for additional dissipation in the event of a fault condition of the load switch. As a result of the dissipation, the temperature of the load switch rises and may result in burning of the load switch. Furthermore, due to the drain-gate short of the load switch, the secondary-side control circuitry is unable to switch the load switch off. In accordance with various embodiments, the secondary-side control circuitry monitors the voltage drop across the load switch and, in response to the fault condition of the load switch, activates circuitry on the secondary side. The circuitry, in response to the activation, triggers a control signal (e.g., changes the power control signal). The control signal is provided as feedback to the primary-side control circuitry. In response to the control signal, the primary-side circuitry lowers the output power (e.g., current and voltage) by limiting an extent to which the power converter is capable of supplying power. The lower output power, which is lower relative to normal operation of the converter (e.g., lower than a voltage that is selected based on feedback from the load but may be a higher voltage than a standby mode or when no load is connected), prevents damage to the load circuitry and reduces dissipation in the load switch.

In various embodiments, the power converter is a multiple output voltage converter (e.g., multi-voltage adapter) that can provide a plurality of different output voltages to one or more loads. The primary side of the converter, due to the multiple output voltages, is not always able to provide over-voltage protection to the circuitry of the load and/or the load switch. For example, when a fault condition occurs that corresponds with an error with the connection at the secondary side of the adapter, the primary side is not able to provide the over-voltage protection. In other instances, a fault condition of the load switch occurs, in which the secondary side is unable to turn the load switch off. The secondary side is used to provide feedback to the primary side to limit an extent to which the power convert is capable of supply power.

In various embodiments, the power converter can respond to another fault condition that corresponds to a secondary side suddenly disconnecting from the supply voltage or a fault condition of the load switch. For example, when the other fault condition occurs, the primary side is not able to provide the over-voltage protection until a primary over-voltage protection is triggered. The primary side provides the primary over-voltage protection by monitoring a voltage across the transformer via a winding on the transformer. When the voltage gets too high (e.g., the secondary-side voltage exceeds a threshold voltage), the primary over-voltage protection is triggered. The primary side does not know the required output voltage and can only protect based on the threshold voltage, which may be higher than the load can handle. In such instances, the secondary side is used to provide over-voltage protection by using another voltage source on the secondary side that is present when supply voltage on the secondary side is disconnected. As the secondary side is powered via the supply voltage, the other voltage source (e.g., the additional power source on the secondary side) allows for the secondary side to limit supply power responsive to the sudden disconnect from the supply voltage.

As a specific example, a load switch is on the secondary side of the converter located along a current path between a supply voltage node and the load that is powered by the converter. When the supply voltage of the secondary-side controller is disconnected, another secondary-side voltage is present and used to turn off the load switch. The current path to the load is blocked responsive to the load switch being turned off. The load switch being turned off can also trigger a primary over-voltage protection. Prior to the trigger, the primary side continues to supply power to the secondary side until the secondary side voltage reaches a threshold voltage (which triggers the primary over-voltage protection). While the load switch is used to protect the load circuitry from an over-voltage condition, the load switch itself can have a fault condition. For example, the fault condition of the load switch includes a drain-gate short that may result in the load switch burning up. The secondary-side control circuitry receives the supply voltage (Vcc) and a converter output voltage (Vout) and in response to a voltage drop across the load switch exceeding a threshold voltage, activates circuitry on the secondary side. The circuitry, such as an opto coupler, provides a control signal indicative of the fault condition of the load switch (e.g., a voltage indicative of a low power mode) to the primary-side control circuitry. In response to the control signal, the primary-side control circuitry limits the supply power used to provide the supply voltage to the secondary side.

Embodiments in accordance with the present disclosure have many different implementations and can be applied to power converters with mains isolation and power converters without mains isolation, and in which a load switch is used to disconnect the load from the output power of the power converter. The figures provided herein illustrate examples of a power converter with mains isolation, such as a flyback converter, for convenience purposes only. However, embodiments are not limited to power converters with mains isolations and can include power converters without mains isolation.

Turning now to the figures, FIG. 1A is an apparatus-level diagram illustrating an example power converter, in accordance with the present disclosure. The power converter, in various embodiments, is a multiple voltage output adapter. In various embodiments, the power converter is an isolated power converter, such as a flyback converter. The secondary side of the converter protects the load switch 110 and/or load circuitry from a fault condition caused by a drain-gate shortage of the load switch 110.

As illustrated by FIG. 1A, the power converter has two sides: a primary side and a secondary side. The input voltage (Vin) is provided by an external source. The power converter converts input voltage (Vin) to output voltage and supply voltage at a node on the secondary side. For example, the input power includes alternating current (AC) and/or direct current (DC) from the external source. The external source can include an electrical energy transmission system, an energy stored device (e.g., batteries and/or fuel cells), an electromechanical system (e.g., generator or alternator), and/or a solar power converter, among other power sources. In a specific embodiment, the power converter includes a cellphone charger that provides power to the cell phone by converting input power from an electrical outlet (e.g., an electrical plug-in) that is AC to DC. The cell phone draws power from the converted DC and uses the DC output voltage to charge its battery. For example, an AC supply of 220V from the electrical outlet is converted to around 5V DC output and output to the cellphone.

Portions of the primary side and portions of the secondary side include power circuitry, such as isolated power circuitry (ISO) 108. The isolated power circuity 108 includes a coil on each side of the converter that are used to transfer power from the primary side to the secondary side through electromagnetic coupling.

The primary side of the power converter includes various circuitry 102 to provide a current to the primary side's winding using the input power. Further, the primary side includes primary-side control circuitry 104. The primary-side control circuitry 104 provides primary over-voltage protection. For example, the primary-side control circuitry 104 monitors a voltage across the transformer (e.g., the ISO 108) via an auxiliary winding on the transformer and triggers the primary over-voltage protection in response to voltage on the secondary side reaching or exceeding a threshold voltage. In response, the primary-side control circuitry 104 controls an extent to which the power converter is capable of supplying power. In various specific embodiments, when primary over-voltage protection is triggered, no power is delivered at all. In some embodiments, the power converter stalls until the mains is unplugged. In other embodiments, a system restart is performed by the power converter after a period of time.

In some instances, however, a fault condition can occur at the secondary side. The primary-side control circuitry 104 does not know the required output voltage (e.g., for the load 112) and can protect based on the threshold voltage from the secondary side, which may be higher than the load 112 can handle. Feedback from the secondary side is used to cause over-voltage protection that can be less than the threshold voltage of the primary over-voltage protection and/or in response to the fault condition of the load switch 110. Feedback is also used for basic power control. For example, using the secondary side feedback, in various embodiments, the primary-side control circuitry 104 controls an extent to which the power converter is capable of supplying power.

The secondary side of the power converter includes a load switch 110, secondary-side control circuitry 106, and other circuitry. The load switch 110 is located along a current path between a node on the secondary side that is provided with the supply voltage and the load 112. The load 112 has load circuitry that draws power from the power converter. For example, an output voltage is used to power the load circuitry. Voltage input to the load switch 110 and/or current output from the load switch 110 (to the load 112) is controlled via feedback 117 from the secondary side of the converter to the primary side and/or via operation of the load switch 110 in an ON mode and OFF mode. The feedback 117 from the secondary side, in some embodiments, is an optical signal from an opto coupler (which is present on both the primary and secondary side, as further described herein), however, embodiments are not so limited and feedback from the secondary side can be provided by a variety of mechanisms, such as by a pulse transformer. The load 112 provides feedback 119 to the secondary-side control circuitry 106 to ask for a different setpoint voltage (e.g., a different setting).

The load switch 110 is controlled by the secondary-side control circuitry 106 to determine the power output to the load 112 (e.g., voltage or current to the load 112). The load switch 110 is turned on and off to operate in an ON mode and an OFF mode. During the ON mode, current is provided to the load 112 via the current path from the node to the load 112. During the OFF mode, current is blocked from the load 112 along the current path. The secondary-side control circuitry 106 receives the supply voltage and controls the load switch 110 to operate in the ON mode and OFF mode. The secondary-side control circuitry 106 can control the load switch 110 to operate in an ON mode in which the current path is used to provide current to the load 112, and in response to a fault condition (e.g., disconnect of supply voltage to circuitry of the secondary side of the isolated power converter, an over-temperature, over current, and communication error load), switches the load switch 110 into an OFF mode in which the current path to the load 112 is blocked. Fault conditions are measured by the secondary-side control circuitry 106 by monitoring the supply voltage (Vcc), measuring the output current, and measuring the temperature of the load switch 110, among other measurements. The load switch 110 is controlled, in various embodiments, by providing one or more control signals (e.g., voltage) to drive the gate terminal of the load switch 110 high or low.

In various embodiments, a fault condition of the load switch 110 occurs and the secondary side protects circuitry against the fault condition. A fault condition of the load switch 110 includes a drain-gate short. For example, the secondary-side control circuitry 106 monitors the load switch 110 by receiving a supply voltage (Vcc) and a converter output voltage (Vout). Using the two values of Vcc and Vout, the secondary-side control circuitry 106 can monitor the load switch 110 for the fault condition by monitoring voltage drop across the load switch 110. A voltage drop across the load switch 110 is monitored, for instance, by detecting a difference between the supply voltage and the converter output voltage. The secondary-side control circuitry 106, in response to the fault condition of the load switch 110, activates circuitry on the secondary side (e.g., and optionally the "other circuitry" of 106, such as an opto pin). The activation can include the secondary-side control circuitry 106, in response to an indication of the fault condition, coupling the circuitry (e.g., via an opto pin) to ground to drive the circuitry with a current level that corresponds with a lower power mode (e.g., a lower mode than the power converted was previously operating at), as further described herein.

The activation can occur in response to the voltage drop exceeding the threshold voltage for greater than a threshold period of time. For example, in response to the voltage drop across the load switch 110 exceeding the threshold voltage, the secondary-side control circuitry 106 starts a timer (e.g., activates timer circuitry). If the voltage drop across the load switch 110 exceeds the threshold voltage for greater than a threshold period of time, the secondary-side control circuitry 106 actives the circuitry. In this way, a feedback 117 to the primary side does not occur if the voltage drop is only present for less than the threshold period of time (e.g., for a short time).

In response to the fault condition of the load switch 110 in which the voltage drop across the load switch 110 exceeds the threshold, the circuitry causes the primary-side control circuitry 104 to limit an extent to which the power converter is capable of supplying power. For example, the circuitry responds to a logic signal indicative of the fault condition by changing to an activated state. The circuitry changes the control signal (responsive to a current applied to the circuitry by the secondary-side control circuitry 106 via the opto pin, as described above) and causes the primary-side control circuitry 104 to limit the converted power. In various embodiments, the control signal includes a current level that corresponds with a power mode of the power converter that is lower than the power converter operated at prior to the control signal, herein sometimes referred to as the "lower power mode."

In various related embodiments, the circuitry (e.g., the opto coupler 114) is used to provide feedback to the primary side to control the supply voltage on the secondary side, such as during basic power control (as described further herein), or in response to fault conditions. For example, the circuitry changes a signal (e.g., a communication of a voltage measurement of the Vcc voltage) which is provided to the primary-side control circuitry 104 as feedback 117. The primary-side control circuitry 104 responds to the signal by decreasing (or increasing) the supply power. As a specific example, the load 112 asks for power and then because of a fault condition, the load switch 110 is switched to operate in an OFF mode (e.g., the load switch 110 is opened). Initially the supply voltage (Vcc voltage) rises which is detected by the voltage measurement of the Vcc voltage (e.g., by a resistance divider circuitry) of the secondary-side control circuitry 106. This is communicated to the primary side by the circuitry and as result the delivered power is reduced.

The circuitry can include an opto coupler 114 in various embodiments. The circuitry changes to an activated state in response to a logic signal indicative of the fault condition and changes the control signal. As used herein, the activated state of the circuitry refers to or includes the circuitry causing the primary-side control circuitry 104 to limit the extent to which the power converter is capable of supplying power by changing a control signal.

Thereby, an opto coupler 114 can be used to provide basic power control and/or feedback to the primary side by changing a control signal (e.g., a basic power control signal) that includes a voltage measurement. When supply voltage on the secondary side is above a threshold value (e.g., the setpoint value), as monitored by the secondary-side control circuitry 106, the opto coupler 114 provides feedback to the primary side. For example, the opto coupler 114 is coupled to both the primary-side control circuitry 104 and the secondary-side control circuitry 106 (as further illustrated by FIGS. 1B and 2A), and a control signal (in the form of a changed optical signal) is provided by the opto coupler 114 to the primary-side control circuitry 104 that indicates a voltage measurement of the supply voltage (Vcc). The setpoint voltage can be compared at the secondary side with the supply voltage (Vcc) using a resistor divider circuitry. The voltage measurement is supplied as a control signal to the primary-side control circuitry 104 by the secondary-side control circuitry 106 changing a current through the opto coupler 114 to change the control signal (e.g., change the optical signal). When the load 112 is changing the setpoint voltage value, the control signal of the opto coupler 114 changes and is provided to primary-side control circuitry 104 to adjust the power delivery, such that the output power (output current or voltage) is at its intended value. This is an example of a basic power control behavior of an example power converter. In response to a fault condition in which supply voltage is connected at the secondary-side control circuitry 106, the secondary-side control circuitry 106 switches the load switch 110 to into an OFF mode and can provide a control signal to the primary side using the same mechanism.

The primary-side control circuitry 104 receives the control signal and in response, limits the extent to which the power converter is capable of supplying power (e.g., stops supplying power). In various embodiments, the primary-side control circuitry 104 includes over-voltage protection circuitry configured and arranged to provide primary over-voltage protection by stopping providing power to the secondary side in response to monitored voltage at the winding of the transformer exceeding a threshold value. For example, the primary-side control circuitry 104 controls the converted power during both the ON mode and OFF mode of the load switch 110.

In various specific embodiments, the power converter is used for USB power-delivery. For example, the secondary-side control circuitry 106 is part of USB power-delivery controller circuit. The primary-side control circuitry 104 can include an over-voltage protection circuit (and optionally is part of another USB power-delivery controller circuit) and receives the control signal from the circuitry on the secondary side. In such embodiments, the circuitry can include the opto coupler 114 configured to respond to the USB power-delivery controller circuit on the secondary side.

The USB power-delivery controller circuit, located on the secondary side, controls the opto coupler 114 and thereby defines the control signal. The USB power-delivery controller circuit communicates with the load about voltage and current levels (e.g., via feedback 119). For example, during normal operations, when the load is changing power modes, the load communicates with the USB power-delivery controller circuit to change the setpoint of the voltage at the secondary side. The changed setpoint of the voltage is communicated to the primary side by the secondary side, such as by an opto coupler (e.g., via feedback 117), which results in the output voltage changing to a new value.

The USB power-delivery controller circuit further controls the load switch 110 to operate in an ON mode in which the current path is used to provide current to the load 112, and in response to a fault condition (e.g., corresponding to a sudden disconnect of supply voltage, over load condition, an over temperature condition), switches the load switch into an OFF mode in which the current path to the load is blocked. The load switch operating in the OFF mode can cause the USB power delivery controller circuit on the primary side to limit an extent to which the isolated power converter is capable of supplying power (e.g., a primary over-voltage protection).

The secondary-side control circuitry 106, in general, is powered via the supply voltage. The secondary side, in various embodiments, is configured to respond to another fault condition corresponding to an effective sudden disconnect of supply voltage at the secondary-side control circuitry 106. For example, circuitry located on the secondary side draws power from the supply voltage when it is present on the secondary side and the drawn power is used by the secondary-side control circuitry to switch the load switch 110 into the OFF mode when disconnected from supply voltage. The circuitry, in specific embodiments, includes the opto coupler 114 (e.g., the opto pin) and/or a gate terminal of the load switch 110, as further described herein.

Figure 1B:
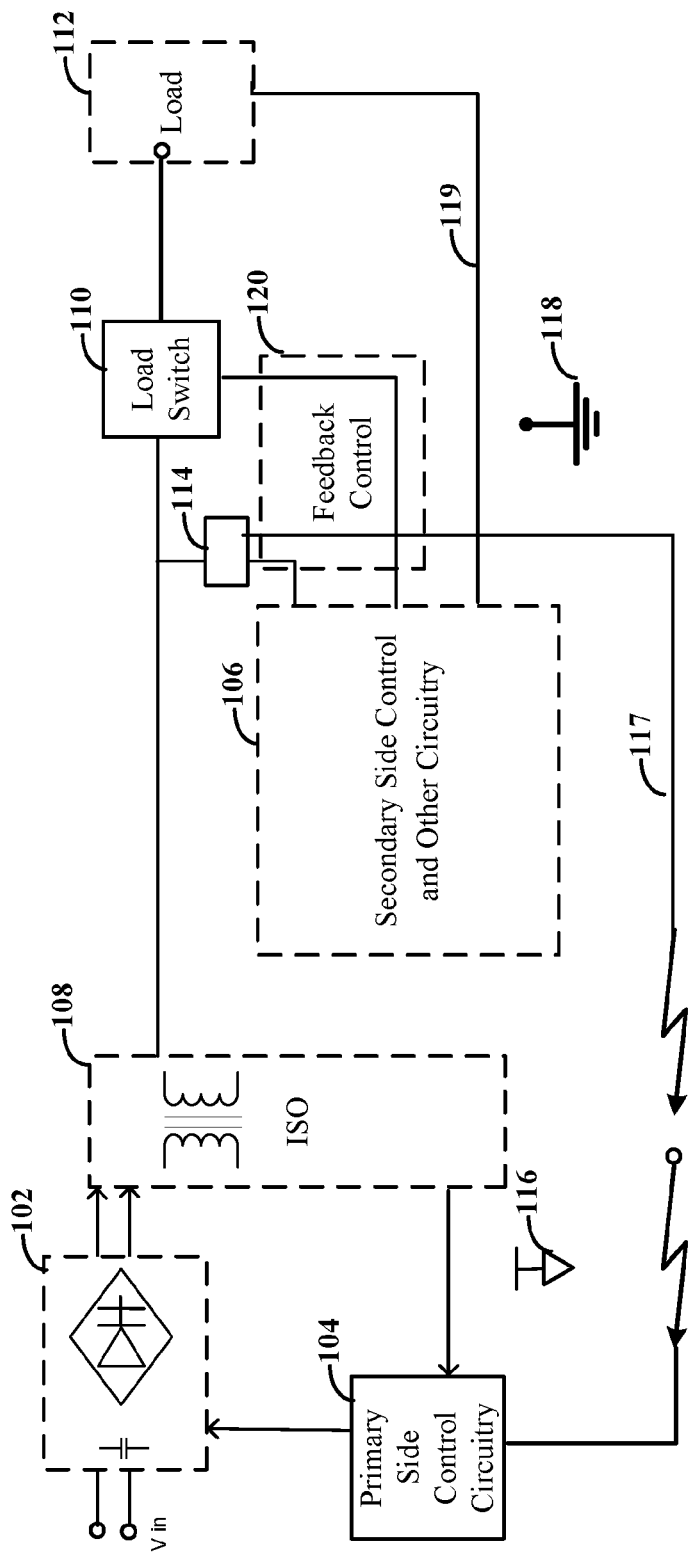
FIG. 1B is an apparatus-level diagram illustrating an example power converter, in accordance with the present disclosure.

FIG. 1B is an apparatus-level diagram illustrating an example power converter, in accordance with the present disclosure. In a number of embodiments, the power converter, and the various circuitry therein, illustrated by FIG. 1B include the power converter illustrated and previously discussed in connection with FIG. 1A. To control the output voltage, the load 112 provides feedback 119 to the secondary-side control circuitry 106 to ask for a different setpoint voltage (e.g., a different setting). Voltage input to the load switch 110 and/or current output from the load switch 110 (to the load 112) is controlled via feedback 117 from the secondary side of the converter to the primary side and/or via operation of the load switch 110 in an ON mode and OFF mode. For example, in response to a change in the setpoint voltage and/or a fault condition, feedback 117 is provided via circuitry (e.g., an opto coupler 114) on the secondary side to the primary-side control circuitry 104.

As illustrated by FIG. 1B, the power converter includes two sides, a primary side and a secondary side. Each side has its own ground 116, 118. For example, the power converter responds to input voltage (Vin) by providing a supply voltage at a node on the secondary side. Portions of the primary side and portions of the secondary side include isolated power circuitry (ISO) 108. The isolated power circuitry 108 includes a coil on each side of the converter that are used to transfer power from the primary side to the secondary side via electromagnetic coupling.

The primary side includes various circuitry 102 to provide a current to the primary side's winding using the input power. Further, the primary side includes primary-side control circuitry 104 that controls an extent to which the power converter is capable of supplying power responsive to feedback 117 from the secondary side.

The secondary side includes a load switch 110, secondary-side control circuitry 106, and other circuitry. The load switch 110 is controlled by the secondary-side control circuitry 106 to operate in the ON mode and the OFF mode. As previously discussed, the load switch 110 is switched to the OFF mode in response to a fault condition (e.g., corresponding to a sudden disconnect of supply voltage, over load condition, an over temperature condition) and the circuitry is used to provide feedback 117 to the primary side. In various embodiments, the load switch 110 turned to the OFF mode causes a primary side over-voltage protection. For example, Vcc on the secondary side increases in response to the load switch 110 being open as the primary side continues to provide supply voltage until a primary over-voltage protection is triggered. The primary-side control circuitry 104 provides the primary over-voltage protection by monitoring a voltage across the transformer via a winding on the transformer. When the voltage exceeds a threshold voltage (e.g., max. voltage), the primary over-voltage protection is triggered. The circuitry can include various feedback control circuitry 120. For example, the circuitry includes an opto coupler 114, a pulse transformer, and/or a gate terminal of the load switch 110.

The secondary-side control circuitry 106 receives the supply voltage (Vcc) and a converter output voltage (Vout), and in response to a fault condition of the load switch 110 corresponding to a voltage drop across the load switch 110 exceeding a threshold voltage, activates the circuitry (e.g., the feedback control circuitry 120) on the secondary side. As previously discussed, when a fault condition of the load switch 110 occurs, the secondary-side control circuitry 106 may be unable to turn the load switch 110 off. Feedback 117 from the secondary side to the primary side, in various embodiments, in response to the fault condition of the load switch 110 is used to protect the load switch 110 and load circuitry from damage due to a drain-gate short of the load switch 110. The secondary-side control circuitry 106 can monitor and identify that the voltage drop across the load switch 110 exceeds a threshold voltage. In various embodiments, the identification further includes the voltage drop exceeding the threshold voltage for greater than a threshold period of time.

In response to the fault condition of the load switch 110, the secondary-side control circuitry 106 activates circuitry on the secondary side to provide feedback to the primary side. For example, the circuitry causes the primary-side control circuitry 104 to limit an extent to which the power converter is capable of supplying power. The secondary-side control circuitry 106 activates the circuitry by providing a gate voltage. For example, the secondary-side control circuitry 106 couples the circuitry to ground, thereby driving the circuitry with a current level indicative of the lower power mode. The circuitry can include the opto coupler 114, in various embodiments.

In response to the control signal (e.g., changed optical signal), the primary-side control circuitry 104 operates at a power mode that is lower than the previous operation mode of the power converter. As an example, the lower power mode during the fault condition of the load switch 110 can involve a supply voltage of 2V to 3V and the output voltage provided to the load 112 is a threshold voltage lower (and below a voltage of an empty battery). As a result, current through the load switch 110 is mitigated and can fall to zero.

In other specific example embodiments, the power converter is a multiple output voltage converter (e.g., adapter) that can provide multiple output voltages to the load. For example, the power converter provides the supply voltage as one of multiple voltages that is selected based on feedback 119 from the load 112 to the secondary-side control circuitry 106 (e.g., a USB power-delivery controller circuit on the secondary side), which can result in feedback 117 from the secondary side to the primary side. For example, the voltage at an input to the load switch 110 is controlled to a setpoint voltage value. When a fault condition occurs, the load switch 110 is operated in an OFF mode (e.g., the load switch is opened), which results in an increase of supply voltage and which is detected by the secondary-side control circuitry 106. Although embodiments are not so limited, and in some embodiments a particular fault condition may not lead to an increase of supply voltage (Vcc) when the load switch 110 is blocking (such as when an over-temperature condition in which the load switch 110 is opened, the supply voltage may not change). In response, power at the primary side is reduced and the output voltage is actively discharged (e.g., discharged close to zero). The circuitry (e.g., an opto coupler 114) changes a control signal in response to an indication of another fault condition or the changed setpoint voltage and causes the primary-side control circuitry 104 to limit the extent to which the isolated power converter supplies power (regardless of which one of multiple voltages that is selected).

For example, the secondary-side control circuitry 106 is part of a power-delivery controller circuit that receives a control signal from the load 112. The power converter, via the primary-side control circuitry 104, provides the supply voltage (Vcc) as one of multiple voltages that is selected based on the feedback 119 from the load 112 which changes a control signal provided as feedback 117 to the primary-side control circuitry 104.

In accordance with a number of embodiments, the power converter can respond to another fault condition corresponding to a sudden effective disconnect of the supply voltage (Vcc) at the secondary-side control circuitry 106. When the fault condition corresponding to an effective sudden disconnection of the supply voltage (at the USB power-delivery controller circuit on the secondary side) occurs, the secondary-side control circuitry 106 switches the load switch 110 into an OFF mode using another voltage supply on the secondary side. For example, circuitry on the secondary side (e.g., the opto coupler 114 via an OPTO pin or the gate terminal of load switch 110) draws power when the load switch 110 is in an ON mode and/or OFF mode and the drawn power is used by the secondary-side control circuitry 106 to switch the load switch 110 into an OFF mode in response to the disconnection of supply voltage.

The other voltage source is provided by the circuitry drawing power from another node during the ON mode and in response to the fault condition corresponding to the effective disconnect of supply voltage at the secondary-side control circuitry 106, the drawn power (e.g., the additional voltage supply) is used to switch the load switch 110 into an OFF mode. The other node, in various embodiments, includes a charged node that is charged during the ON mode. In some embodiments, an opto coupler 114 draws the additional power (e.g., an opto voltage via the OPTO pin) which is present regardless of the mode of the load switch. In other embodiments, when supply voltage is present, the circuitry draws the power to provide an additional secondary-side power. For example, the circuitry drives the gate terminal of the load switch 110 with a gate voltage during the ON mode of the load switch 110. For example, the other node (e.g., a charged node) is the gate terminal of the load switch 110 and/or the OPTO pin that charges (e.g., chargers independently of the mode of the load switch 110) and the secondary-side control circuitry 106 draws power (e.g., current) from the charged node and uses the drawn power to turn the load switch 110 off when the supply voltage is disconnected at the secondary-side control circuitry 106. For example, the OPTO pin can draw supply current from the secondary voltage line via the opto diode of the opto coupler 114 and the series resistor and/or the gate of the load switch 110 can deliver charge. Further, the OPTO pin can draw a continuous current, whereas the gate pin of the load switch 110 can supply a temporary current for a period of time. In various embodiments, the gate voltage of the load switch 110 is used to provide another voltage source on the secondary side when a mechanism other than an opto coupler 114 is used to provide feedback or when the voltage at the opto pin is not used to provide another voltage source. In the OFF mode, the gate voltage is low relative to the ON mode. However, as load switch 110 is already in the OFF mode, the gate voltage is not used to turn the load switch 110 off. By contrast, when the load switch 110 is on, the gate voltage can be used to turn the load switch 110 off when supply voltage is disconnected at the secondary-side control circuitry 106.

Figure 2A:
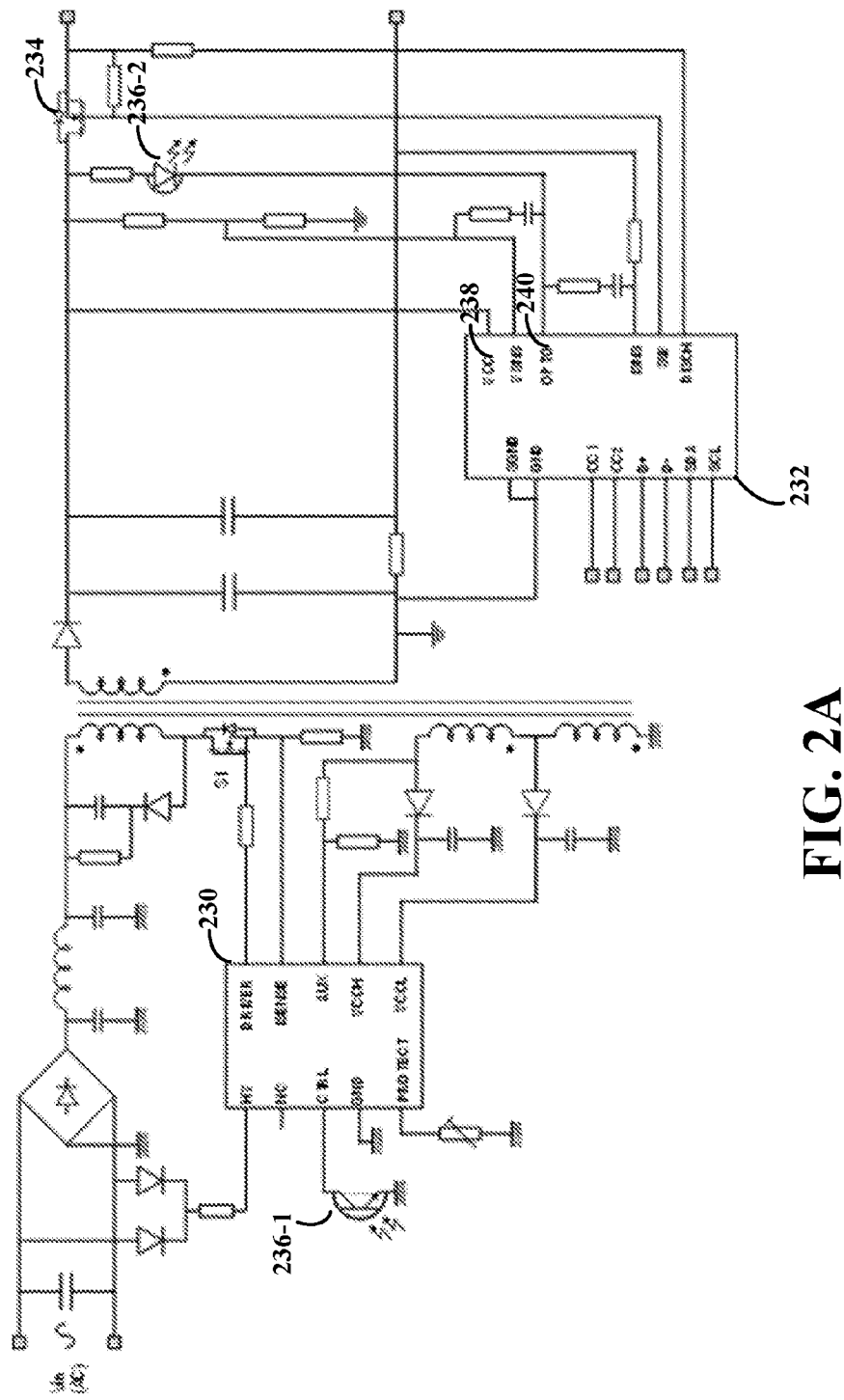
FIG. 2A illustrates an example of a power converter, in accordance with the present disclosure.

FIG. 2A illustrates an example of a power converter, in accordance with the present disclosure.

In various embodiments, at the primary side, a flyback converter is connected, however embodiments in accordance with the present disclosure are not so limited, and a variety of different mains-isolated topology or power converters without mains isolation can be used. The input power on a primary side of the power converter is converted and provided as a supply voltage (Vcc) at a node on a secondary side of the power converter. At the secondary side, the secondary-side control circuitry 232 is used to provide feedback to the primary side. When supply voltage is disconnected from the secondary-side control circuitry 232

(e.g., the VCC pin 238 of the secondary-side control circuitry 232 is not connected), the secondary-side control circuitry 232 does not have power to drive the feedback. In various embodiments, an opto coupler 236-1, 236-2 is used to communicate with the primary side to provide the feedback. The primary-side control circuitry 230 can deliver power to the output without knowing the output voltage required by the load. As the primary-side control circuitry 230 delivers power to the load without being aware of when the voltage is high enough, the primary side continues to provide power until a primary over-voltage protection is triggered and the isolated power converter stops. As further described in connection with FIG. 2B, the secondary-side control circuitry 232 and the primary-side control circuitry 230 can include a number of different commercial available controllers that can be used with feedback as illustrated by the various figures herein.

As illustrated by FIG. 2A, a load switch 234 is used at the output to control the output power to the load. In some embodiments, the load switch 234 can turn off because of the resistance at the load switch 234 between gate terminal and source terminal, when there is no internal supply to turn off the load switch 234. In general, this resistor is high ohmic, because the gate voltage is generated by a charge pump and a low ohmic resistor increases the losses. When the secondary-side control circuitry 232 is not operational and/or is in a start-up state without internal supply to turn off the load switch 234, the load switch 234 can turn off because of the resistor between the gate and source of the load switch 234, as described above.

To turn off the load switch 234 faster than the resistance, circuitry in the secondary-side control circuitry 232 is used to control the load switch 234. During a fault condition of the load switch 234, however, the secondary-side control circuitry 232 may be unable to control the load switch 234. A fault condition of the load switch 234 is detected by the secondary-side control circuitry 232 monitoring a voltage drop across the load switch 234, as previously described. In response to the voltage drop exceeding a threshold, an opto coupler 236-1, 236-2 (or other circuitry in various embodiments) provides feedback to primary side to lower the power mode of the power converter from the current/previous power mode.

The opto coupler 236-1 and 236-2 can provide the feedback to the primary side via the opto pin 240. As illustrated, the opto coupler 236-1, 236-2 is coupled to the primary side (e.g., a portion 236-1) and the secondary side (e.g., another portion 236-2) and is used to provide feedback to the primary side, such as for basic power control. In specific embodiments, the portion 236-2 of the opto coupler 236-1, 236-2 coupled to the secondary-side control circuitry 232 is or includes a diode that emits light based on a current applied thereto. The secondary-side control circuitry 232 applies the current to the opto coupler (e.g., portion 236-2) based on a comparison of the supply voltage (input or output from the load switch 234) to the setpoint voltage to provide feedback to the primary side (and to provide basic power control). Another portion 236-1 of the opto coupler 236-1, 236-2 that is coupled to the primary-side control circuitry 230 is or includes a transistor that is photo-sensitive and detects light from the diode (e.g., as the control signal for basic power control and/or other feedback). For example, a bright light can indicate maximum voltage is measured (e.g., decrease power) and less bright light can indicate output power is fine.

To turn off the load switch 234 faster than the resistance and in response to another fault condition corresponding to a sudden disconnect the supply voltage, circuitry (e.g., the OPTO pin 240 corresponding to the opto coupler 236-1, 236-2 and/or the gate voltage of the load switch 234) on the secondary side draws power when the supply voltage is present. This drawn power is used to turn the load switch 234 off by the secondary-side control circuitry 232. In general, all circuitry on the secondary side are supplied power via the VCC pin 238. When this pin is not connected, the drawn power (e.g., OPTO voltage or gate voltage) is used. This drawn power, which is an additional secondary-side power source, is drawn from the supply voltage and used when the supply voltage is disconnected. The circuitry that draws the power, in some embodiments, is the gate terminal of the load switch 234. In other embodiments, and an opto coupler 236-1, 236-2 draws the power via the OPTO pin 240.

Figure 2B:
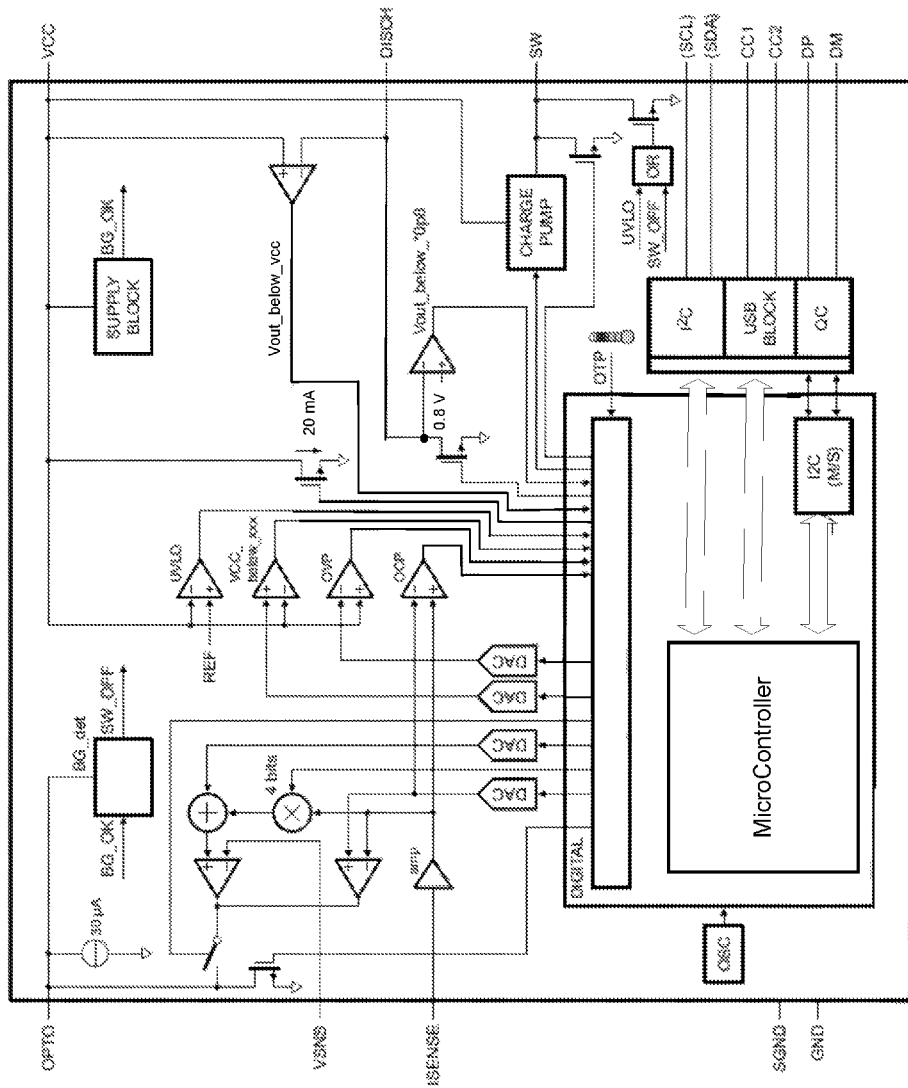
FIG. 2B illustrates an example of a secondary-side control circuitry, in accordance with the present disclosure.

As previously described, the primary-side and secondary-side control circuitries can be implemented using a number of different commercially available controllers. Examples of commercially available primary-side control circuitry include a TEA1836T GreenChip Switching Mode Power Supply (SMPS) primary side control integrated circuity and a TEA1936T GreenChip SMPS primary side control integrated circuity, both available from NXP Semiconductors N.V. FIG. 2B illustrates an example of a secondary-side control circuitry, in accordance with the present disclosure, such as a commercially available secondary-control circuitry which is a Universal Serial Bus (USB)-power delivery (USB-PD) type-C controller. However, embodiments are not so limited and can include a variety of different commercially available controllers that provide feedback from the secondary side to the primary side as described herein.

In various specific embodiments, the secondary-side control circuitry, such as the control circuitry illustrated by FIG. 2B, is a USB-PD type-C and other protocols controller with a high integration level and near fully digital bare minimum of external components. The secondary-side control circuitry can drive an N-Type metal-oxide-semiconductor field-effect switch (NMOS) load switch and can achieve high power density SMPS with efficiency over a load range. When applied in combination with a primary-side control circuitry, example secondary-side control circuitry can meet CoC Tier-2, EuP lot 6, DOE v6 energy efficiency requirement specification. In addition, the secondary-side control circuitry can incorporate the full set of type C USB-PD protocols that are used for an AC-to-DC SMPS adapter. Example protocol support includes USB-PD type-C compliance for BMC communication, other proprietary protocol support (e.g., Quick charge 3.0), CV and CC control (4-level programmable), wide VCC operation range (e.g., 3.2V to 20V), SW pin to drive external isolation N-MOSFET directly, and a combination thereof.

As illustrated by FIG. 2B, the secondary-side control circuitry can include a microcontroller that includes memory and address/data control circuitry. However, embodiments in accordance with the present disclosure are not limited to the specific example of a secondary-side control circuitry as illustrated by FIG. 2B and can include a variety of control circuitry. An opto coupler is coupled to the secondary-side control circuitry via an OPTO pin. As previously described, the secondary-side control circuitry uses the opto coupler to provide feedback to the primary side. For example, the secondary-side control circuitry drives the opto coupler with a current (that is changed) using the OPTO pin. The current changes the signal of the opto coupler (e.g., the optical signal of a diode of the opto coupler), which is sensed by a transistor of the opto coupler that is coupled to the primary-side control circuitry (and used to change the converter power).

In some specific embodiments, the switch pin (SW pin) of the secondary-side control circuitry can be used to drive an external load switch (NMOS), which enables or disables the output power over Vbus. When the output voltage is reduced or the type-C cable is detached, the discharge pin (DISCH pin) of the secondary-side control circuitry can allow for the output voltage to discharge in a controlled manner to the voltage level required by the USB-PD protocol. Further, the gate voltage can be generated by the charge pump of the secondary-side control circuitry.

In other related-specific embodiments, the secondary-side control circuitry can provide various protections, such as OverTemperature Protection (OTP), adaptive OverVoltage Protection (OVP), Short Circuit Protection (SCP), and/or UnderVoltage LockOut (UVLO) protection. Other example protections include OverCurrent Protection (OCP), open ground protection, Vcc to SW short protection, open Vcc detection, and CC1/CC2 to Vout short protection.

The secondary-side control circuitry can include various other pins, in some related-specific embodiments. As previously described, the DISCH pin of the secondary-side control circuitry can be used to discharge the output voltage in a controlled manner to the voltage level required by the USB-PD protocol. The VCC pin is used to power the secondary-side control circuitry. In various embodiments, in response to a sudden disconnect of VCC, another voltage source is used (e.g., the gate voltage of the load switch via the SW pin or a voltage on the OPTO pin). As previously described, the external load switch is controlled by the secondary-side control circuitry. The pins SCL (e.g., I2C bus serial clock input/output) and SDA (e.g., I2C bus serial data input/output), as one of skill in the art would appreciate, are conventional pins to Inter-Integrated Circuit (I2C) (e.g., the I2C block). Further, the pins CC1 (e.g., a type C CC1 line detection), CC2 (e.g., a type C CC2 line detection), DP (e.g., USB DP input) and DM (e.g., USB DM input), as one of skill in the art would appreciate, are conventional pins to USB (e.g., the USB block). The CC2 and CC2 pins can be used for plug attach/detach detection. The DP and DM pins can be used for quality control (e.g., the QC block to the USB I2C Adapter (master/slave)). For example, the DP and DM pins can be used to support proprietary protocols and the Battery Charger 1.2 specification. The SGBN pin includes a sense ground pin and GND includes a ground pin, as may be appreciated by one of skill in the art.

In a number of specific-embodiments, the secondary-side control circuitry can monitor for various fault conditions. For example, the VSNS pin of an example secondary-side control circuitry is used to sense input voltage (e.g., supply voltage at a node that is indicative of voltage input to the load switch). The ISENSE pin of the secondary-side control circuitry can be used to sense input current (e.g., current at a node that is indicative of current input to the load switch). For example, the ISENSE pin can be used for CC mode, cable compensation, and OCP. A fault condition of the load switch, as previously described, can be monitored by the voltage difference between VCC and the output voltage (e.g., via the DISCH pin and/or capacitance on the DISCH pin in combination with an external current limiting resistor).

In various-specific embodiments, the primary-side control circuitry can be used for switched mode power supplies. For example, the primary-side control circuitry used can be beneficial in flyback topologies to be used either standalone or together with USB-PD controllers, such as illustrated by FIG. 2B, at the secondary side. The built-in green functions provide good efficiency at all power levels. The primary-side control circuitry can be compatible with multiple output voltage applications over a wide output range from 5V to 20V in Constant Voltage (CV) mode, when used with a USB-PD secondary side controller. In a number of specific embodiments, the primary-side control circuitry and the secondary-side control circuitry also support Constant Current (CC) mode operation down to 3V.

In specific embodiments, at high power levels, the primary-side control circuitry operates in Quasi-Resonant (QR) mode. At lower power levels, the primary-side control circuitry switches to Frequency Reduction (FR) or Discontinuous Conduction Mode (DCM) and limits the peak current to a minimum level. Valley switching is used in all operating modes.

At low power levels, the primary-side control circuitry can uses burst mode to regulate the output power. A special opto current reduction regulation has been integrated which reduces the average opto current in all modes to a minimum level. This reduction ensures efficiency at low power and excellent no-load power performance. As the switching frequency in this mode is greater than 25 kHz and the burst repetition rate is regulated to a low value, the audible noise is minimized. During the non-switching phase of the burst mode, the internal IC supply current is minimized for further efficiency optimization.

The primary-side control circuitry can include an accurate OverPower Protection (OPP). If the output is shorted, the system switches to low-power mode. The output current is then limited to a lower level. Example primary-side control circuitry can enable low-cost, efficient and reliable supplies including multiple output voltage support for power requirements up to 75 W using a minimum number of external components.

In a number of specific embodiments, features of the primary-side control circuitry can include SMPS controller IC supporting multiple-output-voltage applications, wide output range (5V to 20V in CV mode and 3V to 20V in CC mode), and/or adaptive dual supply for efficiency over the entire output voltage range. Alternatively and/or in addition, by using a primary-side control circuitry in accordance with various embodiments, integrated high-voltage start-up and X-capacitor discharge, continuous Vcc regulation during start-up and protection via the HV pin, and integrated soft start can be achieved. Other general features can include allowing a minimum Vcc capacitor value, reduced opto current enabling low no-load power (20 mW at 5V output), and fast transient response from 0 to full load. Further, the primary-side control circuitry can provide low supply current during normal operation (e.g., 0.6 mA without load) and low supply current during non-switching state in burst mode (e.g., 0.2 mA).

In related specific embodiments, protection features of the primary-side control circuitry can include mains voltage compensated OverPower Protection (OPP), OverTemperature Protection (OTP), integrated overpower time-out, and integrated restart timer for system fault conditions. Additional protection features can include accurate OverVoltage Protection (OVP), general-purpose input for safe restart protection; for use with system OverTemperature Protection (OTP), driver maximum on-time protection, and brown-in and brown-out protection.

Figure 3:
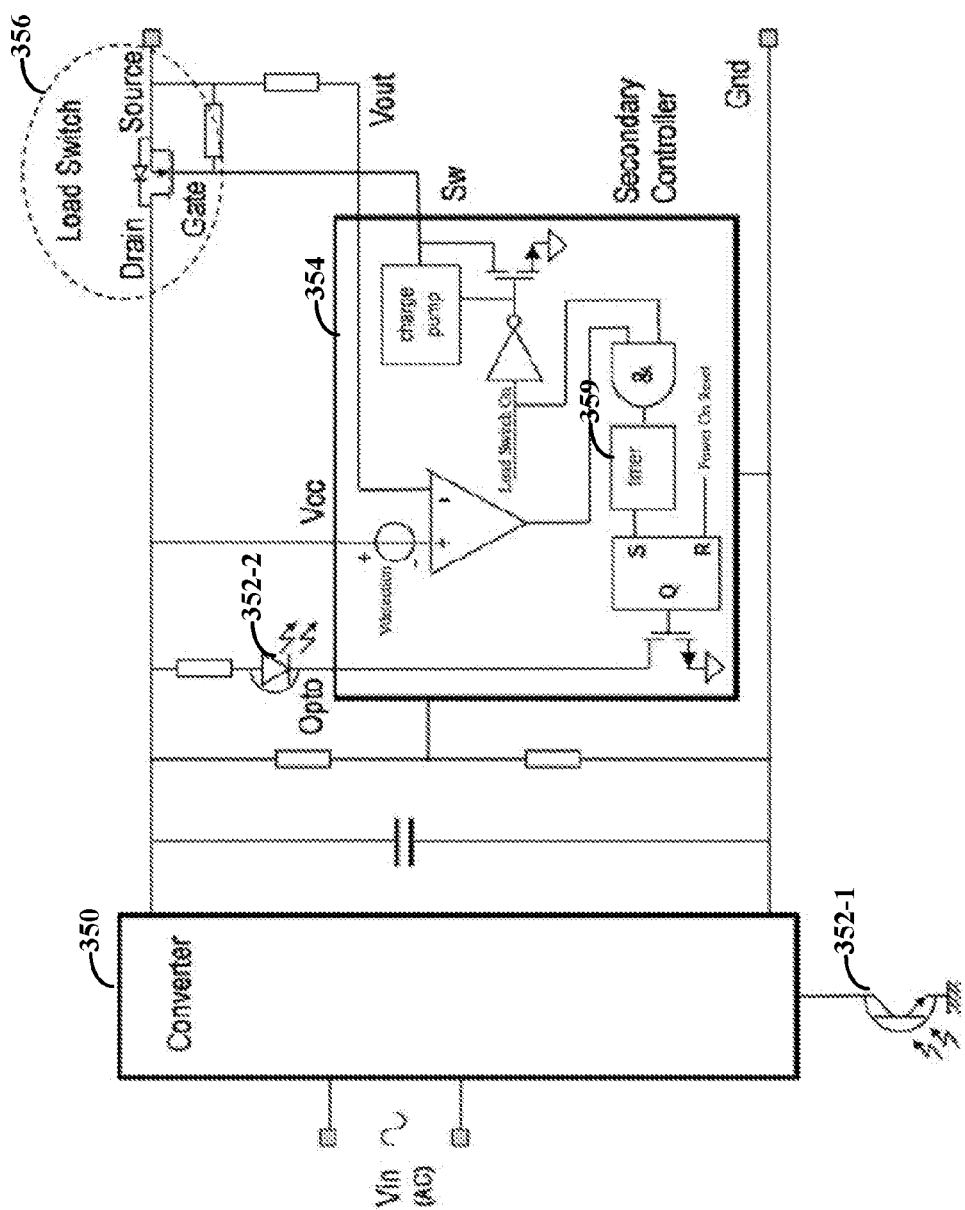
FIG. 3 illustrates an example of a power converter, in accordance with the present disclosure.

FIG. 3 illustrates an example of a power converter, in accordance with the present disclosure. More particularly, FIG. 3 illustrates secondary side of the power converter providing feedback to the primary side 350 in response to a drain-gate short of the load switch 356. In various embodiments, the load switch 356 is an NMOS.

In normal operation, a voltage drop across the load switch 356 is below a threshold voltage. A typical voltage drop at maximum current can be 100 mV. In response to a fault condition of the load switch 356 in which a drain-gate short occurs, the load switch 356 operates as a source follower and the voltage drop across the load switch 356 increases to a threshold voltage value or higher. For example, a threshold voltage for a logic level field-effect-transistor (FET) is 1V. A voltage drop that is above the threshold voltage (e.g., a detection range between 200 mv and 1V) is detected by the secondary-side control circuitry 354. In response to the detection, the secondary-side control circuitry 354 activates circuitry to provide feedback to the primary side. For example, the circuitry that is activated is an opto coupler 352-1, 352-2 and the secondary-side control circuitry 354 increases the current through the opto coupler 352 by pulling the opto pin to ground. In response to the increased opto current, the opto coupler 352-1, 352-2 provides a control signal to the primary side (e.g., the changed signal as provided by the portion 352-2 of the opto coupler is sensed by the portion 352-1 of the opto coupler which is coupled to the primary-side control circuitry) to cause a lower power mode of operation, as further described herein.

In various embodiments, in response to the detection and the load switch 356 being in an ON mode, the secondary-side control circuitry 354 starts a timer. For example, the secondary-side control circuitry 354 includes timer circuitry 359 that counts time in response to being started. The timer mitigates switching to a low power mode of operation when the load switch 356 changes to an ON mode in a predetermined time for a charge pump that supplies the gate charge with limited output current. A typical time can be 100 ms. If the voltage drop is above the threshold voltage for greater than a threshold period of time, the secondary-side control circuitry 354 activates the circuitry to provide feedback to the primary side 350 and to cause the lower power mode of operation.

The load switch fault condition protection is triggered, in various embodiments, at the secondary side. For example, a control signal is triggered via the circuitry and output to the primary-side control circuitry. The control signal is provided by an opto coupler 352-1, 352-2. The opto coupler 352-1, 352-2 is powered via the supply voltage (Vcc). However, embodiments are not so limited. In some embodiments, the control signal is provided to the primary side via other mechanisms, such as pulse transformer or the main transformer.

In various embodiments, the opto coupler 352-1, 352-2 (e.g., the portions 352-2) is driven with a current that feeds back to the primary-side control circuitry and forces the lower power mode of operation. The output voltage, during the lower power mode of operation, is reduced to a level where the opto coupler 352-1, 352-2 conducts current by pulling down the opto pin with an NMOS with a gate voltage (e.g., a Vcc voltage between 2V and 3V and opto coupler current of 2 mA). For example, the opto pin can be coupled to ground to drive the opto coupler 351-1, 352-2 with the current level corresponding with the lower power mode of operation.

In various embodiments, a reset of the drain-gate short latch occurs if the supply voltage drops to zero by removing the converter (e.g., a charger or adapter) from the mains. A power-on-reset signal then resets the latch.

Figure 4:
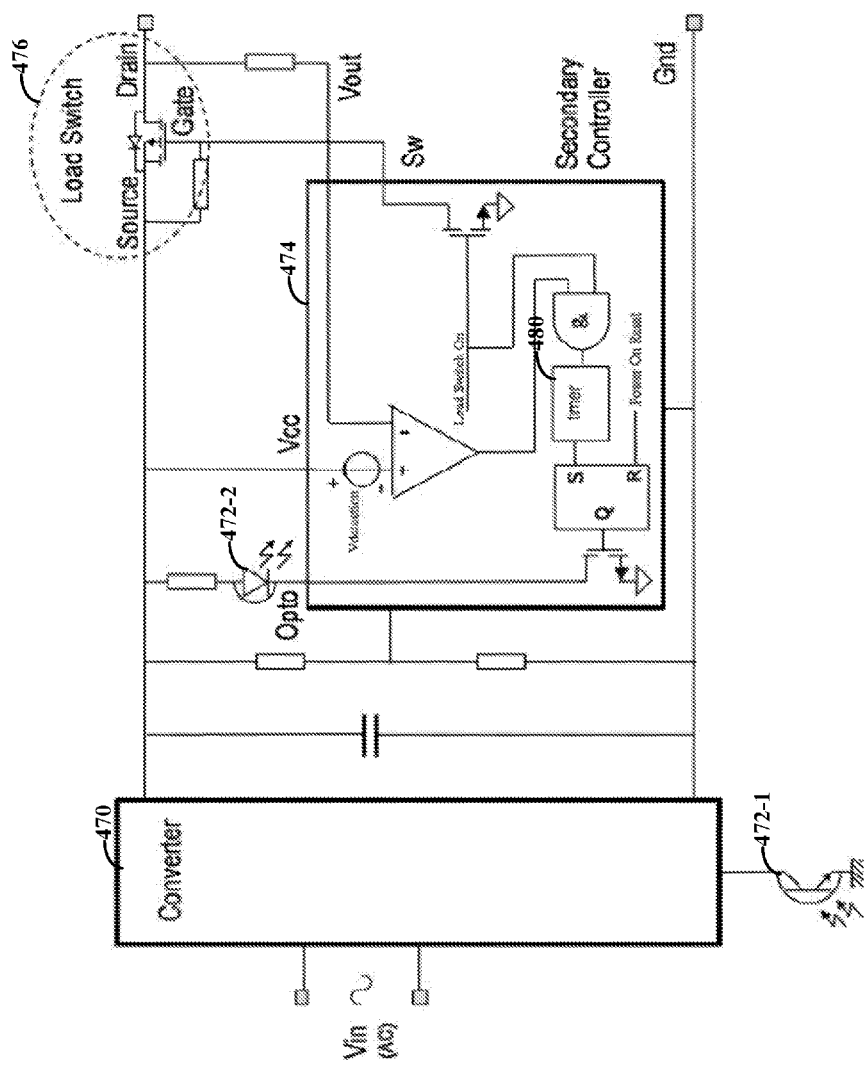
FIG. 4 illustrates an example of a power converter, in accordance with the present disclosure.

FIG. 4 illustrates an example of a power converter, in accordance with the present disclosure. In various embodiments, the load switch 476 is a P-Type MOS (PMOS) load switch. A drain-gate short of the load switch 476 is detected by determining a voltage drop across the load switch 476 is greater than a threshold voltage for a greater than a threshold period of time.

The topology of a PMOS load switch is functionally equal to an NMOS load switch but may not use a charge pump for turning the PMOS load switch to an ON mode and the drain and source connections are swapped.

The Vout measurement of the load switch drain-gate short protection, in various embodiments, is combined with an output voltage measurement of the discharge function. The discharge function is used for a multiple output voltage converter and is triggered when the charger changes from a high output voltage to a lower output voltage. The discharge function includes discharging a capacitor via an internal sink current and an external resistor that keeps the dissipation outside the Integrated Circuit (IC) package (e.g., a chip). For measurement of the output voltage, the sink current is disabled periodically for accurate output voltage measurement without the voltage drop over the resistor.

Responsive to the fault condition, a control signal is generated via circuitry on the secondary side and output to the primary-side control circuitry of the converter. For example, the secondary-side control circuitry 474 activates the circuitry in response to the fault condition. In various embodiments, the fault condition of the load switch 476 occurs in response to the voltage drop exceeding a threshold voltage for greater than a threshold period of time (which is determined using the timer circuitry 480 as previously discussed). The control signal is provided by an opto coupler 472-1, 472-2, in various embodiments. The opto coupler 472-1, 472-2 is powered via the supply voltage. The primary-side control circuitry receives the controls signal and, in response, limits the supply power used to provide the supply voltage to the secondary side. However, embodiments are not so limited. In some embodiments, the control signal is provided to the primary side 470 via other mechanisms, such as a pulse transformer of the main transformer. The limited power supplied, in various embodiments is sufficient to reduce the output current and load switch dissipation while continuing to power the opto coupler 472-1, 472-2 and the secondary-side control circuitry 474. For example, the supply voltage is decreased resulting in a converter output voltage being a threshold lower than the supply voltage and current through the load switch falling to zero. The VCC supply voltage is also lowered as a result, but to a level in which the opto coupler 472-1, 472-2 can still conduct current and the secondary-side control circuitry 474 can pull down the opto pin (e.g., with sufficient gate voltage such as between 2V and 3V).

As previously described, the figures provided herein illustrate examples of a power converter with mains isolation, such as a flyback converter. However, embodiments are not limited to power converters with mains isolations and can include power converters without mains isolation. For example, power converters in accordance with the present disclosure can include boost and buck power converter that do not have mains isolation. The controller circuitry of the power converter without mains isolation includes control circuitry that includes the functionality of the primary-side control circuitry and the secondary-side control circuitry (e.g., a single control circuit that has both the primary-side control circuitry and secondary-side control circuitry) and that provides power control and responds to the fault condition of the load switch.

As may be appreciated, FIGS. 3 and 4 illustrate portions of a converter but do not illustrate all of the converter functionality, such as the functionality of a flyback converter. Such illustrations are provided for illustrative purposes of the over-voltage protection when the supply voltage is effectively disconnected at the secondary-side circuitry.

The power converter, as illustrated and described herein, such as by FIGS. 1A-1B, can be used to perform various methods. In various embodiments, the method includes providing a supply voltage at a node on a secondary side of the power converter, wherein the supply voltage is one of multiple voltages that is selected based on feedback from a load to a controller circuitry (e.g., secondary-side control circuitry and/or control circuitry of a power converter without mains isolation). The supply voltage is received at the node and passed along a current path from the node to the load. In response to the presence of the supply voltage at the control circuitry, the method includes controlling a load switch to operate in an ON mode in which the current path is used to provide current to the load. And, in response to a fault condition corresponding to a voltage drop across the load switch exceeding a threshold voltage for a time greater than a threshold period of time, the method includes providing a control signal to the control circuitry (e.g., primary-side control circuitry and/or control circuitry of a power converter without mains isolation) to limit an extent to which the power converter is capable of supplying power for providing the supply voltage. In various embodiments, in response to the control signal, the power converter operates in a power mode that provides supply voltage that is lower than the multiple voltages in response to the control signal.

As previously discussed, the power converter can include mains isolation or not include mains isolation. A power converter with mains isolation includes the primary-side control circuitry and the secondary-side control circuitry. A power converter without mains isolation include controller circuitry that provides the power control and responds to the fault condition of the load switch (e.g., it includes both the primary-side control circuitry and secondary-side control circuitry and/or the functionality thereof). Further, the specific control circuitry is not limited to that illustrated by the figures herein and can include a variety of primary and secondary-side control circuitry. The primary-side and secondary-side control circuitries can be implemented using a number of different commercially available controllers that provide feedback from the secondary side to the primary side as described herein and/or controllers for power converters without mains isolation.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

For the purposes of this document, the following terms and definitions apply: power converter refers to or includes circuitry configured to deliver power to a load that includes two sides; lower power mode refers to or includes an operation mode of the power converter where the output power is lower than the output power of the power converter operated in other power modes corresponding to one or more voltages selected based on feedback from the load (e.g., higher power modes); however, the lower power mode may not be lower than all modes of the power converter, such as a no-load or standby mode in which the output power is lower than the low power mode); fault condition of the load switch refers to or includes a drain-gate short of the load switch; load switch refers to or includes circuitry that allows or blocks a current path to a load; supply voltage (Vcc) refers to or includes voltage received at a node on the secondary side; a converter output voltage (Vout) refers to or includes a voltage provided to a load; load refers to or includes a device or component that consumes power; load circuitry refers to or includes circuitry that draws power from the apparatus; voltage drop refers to or includes a voltage difference between the input of a load switch and the and the output of the load switch; USB power-delivery controller circuit refers to or includes circuitry configured to negotiate power using a USB connection, etc.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller and/or other circuit-type depictions (e.g., reference numerals 106 and 238/230 of FIGS. 1A, 1B, and 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more illustrated items in this context represent circuits (e.g., discrete logic circuitry or (semi-)programmable circuits) configured and arranged for implementing these operations/activities, as may be carried out in the approaches shown in FIGS. 3 and 4. In certain embodiments, such illustrated items represent one or more computer circuitry (e.g., microcomputer or other CPU) which is understood to include memory circuitry that stores code (program to be executed as a set/sets of instructions) for performing a basic algorithm (e.g., receive Vcc and Vout, control the load switch, activate circuitry in response to a fault condition) or the more complex process/algorithm as described at FIGS. 3 and 4 to perform the related steps, functions, operations, activities, etc. The specification may also make reference to an adjective that does not connote any attribute of the structure ("a first opto coupler" and "second opto coupler" in which case the adjective is merely used for English-language antecedence to differentiate one such similarly-named structure from another similarly-named structure (e.g., "a first opto coupler . . . " is interpreted as "opto coupler"). On the other hand, the specification may make reference to an adjective that is intended to connote an attribute of the structure (e.g., primary-side control circuitry), in which case the adjective (e.g., control) refers to at least a portion of the named structure (e.g., circuitry) being configured to have/perform that attribute (e.g., control circuitry refers to at least a portion of a circuitry that includes/performs the attribute of controlling).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, a power converter can include multiple opto couplers configured to both provide feedback during a fault condition of a load switch and another fault condition. Such modifications do not depart from the true spirit and scope of various aspects of the disclosure, including aspects set forth in the claims.

What is claimed is:

1. An apparatus for delivering power to a load having load circuitry configured to draw power from the apparatus, the apparatus comprising:
   a power converter configured and arranged to convert input power at a primary side of the power converter to output power and to a supply voltage at a node on a secondary side of the power converter;
   on the primary side of the power converter, a primary-side control circuitry configured and arranged to limit an extent to which the power converter is capable of supplying power for providing the supply voltage at an output of the power converter;
   on the secondary side of the power converter, a load switch configured and arranged along a current path between the node and the load having the load circuitry configured to draw power from the apparatus;
   on the secondary side of the power converter, secondary-side control circuitry configured and arranged to receive the supply voltage and a converter output voltage, and to control the load switch to operate in an ON mode, in which the current path is used to provide current to the load, and in response to a fault condition corresponding to a voltage drop across the load switch exceeding a threshold voltage, activates circuitry on the secondary side; and
   the secondary side of the power converter including the circuitry configured and arranged, in response to the fault condition in which the voltage drop across the load switch exceeds the threshold voltage, to cause the primary-side control circuitry to limit an extent to which the power converter is capable of supplying power;
   wherein the secondary-side control circuitry is configured and arranged to monitor the voltage drop across the load switch by detecting a difference between the supply voltage at the secondary side and the converter output voltage.

2. The apparatus of claim 1, wherein the secondary-side control circuitry is configured and arranged to activate the circuitry in response the voltage drop across the load switch exceeding the threshold voltage for greater than a threshold period of time.

3. The apparatus of claim 1, wherein the secondary-side control circuitry is configured and arranged to monitor the voltage drop across the load switch by detecting a difference between the supply voltage at the secondary side and a combination of the converter output voltage and an output of a discharge function.

4. The apparatus of claim 1, wherein the power converter does not have mains isolation, the power converting including controller circuitry that includes the primary-side control circuitry and the secondary-side control circuitry and is configured and arranged to provide power control and respond to the fault condition of the load switch.

5. The apparatus of claim 1,
   wherein the secondary-side control circuitry further includes timer circuitry configured and arranged to count time and the secondary-side control circuitry is further configured and arranged to start the count of the timer circuitry in response to the fault condition of the load switch and to activate the circuitry in response the voltage drop across the load switch exceeding the threshold voltage for greater than a threshold period of time using the timer circuitry.

6. The apparatus of claim 1, wherein in response to another fault condition corresponding to an effective sudden disconnection of the supply voltage at the secondary-side control circuitry, the secondary-side control circuitry is further configured and arranged to switch the load switch into an OFF mode in which the current path to the load is blocked.

7. The apparatus of claim 1, wherein the circuitry includes an opto coupler configured and arranged to respond to a logic signal indicative of the fault condition by changing a control signal through which the circuitry causes the primary-side control circuitry to limit an extent to which the power converter is capable of supplying power.

8. The apparatus of claim 1, wherein in response to the fault condition of the load switch in which the voltage drop across the load switch exceeds the threshold voltage, the circuitry is configured and arranged to cause the primary-side control circuitry to limit an extent to which the power converter is capable of supplying power by triggering a control signal that includes a current level corresponding with a power mode of the power converter that is lower than the power converter operates prior to the control signal.

9. The apparatus of claim 8, wherein the secondary-side control circuitry further includes an opto pin and is configured and arranged to, in response to an indication of the fault condition of the load switch, couple the opto pin to ground to drive the circuitry with the current level.

10. The apparatus of claim 9, wherein the circuitry includes an opto coupler, and the primary-side control circuitry is configured and arranged to limit the extent to which the power converter is capable of supplying power by operating in the power mode that includes lower power as compared to a previous power mode, resulting in a reduction in the converter output voltage, and in response to the reduction in the converter output voltage,
   the opto coupler is configured and arranged to conduct current, and
   the secondary-side control circuitry is configured and arranged to pull down the opto pin.

11. The apparatus of claim 1, wherein the circuitry is part of USB power-delivery controller circuit, and wherein the circuitry includes an opto coupler configured and arranged to operate in an activated state during the ON mode and OFF mode of the load switch and to respond to the USB power-delivery controller circuit.

12. The apparatus of claim 11, wherein the circuitry includes an opto coupler configured and arranged to operate in an activated state during the ON mode and OFF mode of the load switch, wherein the USB power-delivery controller circuit, located on the secondary side, is configured and arranged to control the opto coupler to provide feedback to the primary side.

13. The apparatus of claim 1, wherein the power converter is further configured and arranged to provide the supply voltage as one of multiple voltages that is selected based on feedback from the load to the secondary-side control circuitry, and wherein the circuitry is further configured and arranged to cause the primary-side control circuitry to limit the extent to which the power converter-supplies power, regardless of which one of multiple voltages that is selected by triggering a control signal.

14. An apparatus for delivering power to a load having load circuitry configured to draw power from the apparatus, the apparatus comprising:
- a power converter configured and arranged to convert input power at a primary side of the power converter to output power and to a supply voltage at a node on a secondary side of the power converter;
- on the primary side of the power converter, a primary-side control circuitry configured and arranged to limit an extent to which the power converter is capable of supplying power for providing the supply voltage;
- on the secondary side of the power converter, a load switch configured and arranged along a current path between the node and the load having the load circuitry configured to draw power from the apparatus;
- on the secondary side of the power converter, a USB power-delivery controller circuit configured and arranged to receive the supply voltage and a converter output voltage, and to control the load switch to operate in an ON mode in which the current path is used to provide current to the load, and in response to a fault condition of the load switch corresponding to a voltage drop across the load switch exceeding a threshold voltage, activates circuitry on the secondary side; and
- the secondary side of the power converter including the circuitry configured and arranged, in response to the fault condition in which the voltage drop across the load switch exceeds the threshold voltage, to cause the primary-side control circuitry to limit an extent to which the power converter is capable of supplying power;
- wherein the USB power-delivery controller circuit is further configured and arranged to,
  - monitor the voltage drop across the load switch by detecting a difference between the supply voltage and the converter output voltage; and
  - in response the voltage drop across the load switch exceeding the threshold voltage for greater than a threshold period of time, activate the circuitry.

15. The apparatus of claim 14, wherein the USB power-delivery controller circuit further includes an opto pin and wherein in response to the fault condition of the load switch, the circuitry is configured and arranged to cause the primary-side control circuitry to limit an extent to which the power converter is capable of supplying power by coupling the opto pin to ground to drive the circuitry with a current level corresponding with a lower power mode of the power converter as compared to a previous power mode.

16. The apparatus of claim 14, wherein the USB power-delivery controller circuit is further configured and arranged to:
- monitor the voltage drop across the load switch by detecting a difference between the supply voltage and a combination of the converter output voltage and an output of a discharge function; and
- in response the voltage drop across the load switch exceeding the threshold voltage for greater than a threshold period of time, activate the circuitry.

17. A method comprising:
- converting input power at a primary side of a power converter to output power and providing a supply voltage at a node on a secondary side of the power converter, wherein the supply voltage is one of multiple voltages that is selected based on feedback from a load to a control circuitry;
- receiving the supply voltage at the node and passing the supply voltage along a current path from the node to the load;
- in response to a presence of the supply voltage at the control circuitry, controlling a load switch to operate in an ON mode in which the current path is used to provide current to the load; and
- in response to a fault condition corresponding to a voltage drop across the load switch exceeding a threshold voltage for greater than a threshold period of time, providing a control signal to the control circuitry to limit an extent to which the power converter is capable of supplying power for providing the supply voltage.

18. The method of claim 17, further including operating in a power mode that provides another supply voltage that is lower than the multiple voltages in response to the control signal using a primary-side control circuitry.

* * * * *